A. L. KELTNER.
CHAIN FASTENER.
APPLICATION FILED AUG. 19, 1920.
1,374,579.
Patented Apr. 12, 1921.
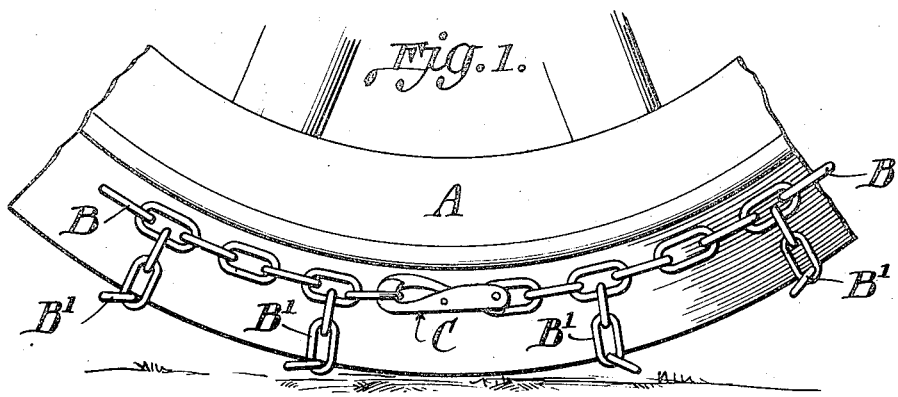
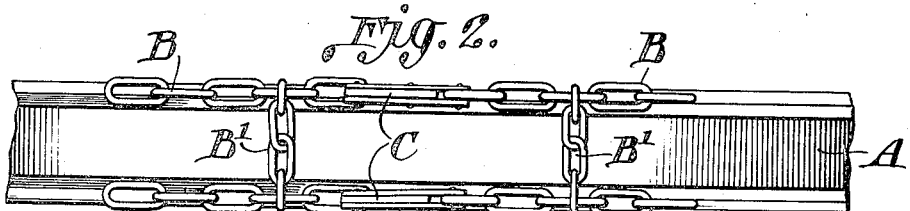
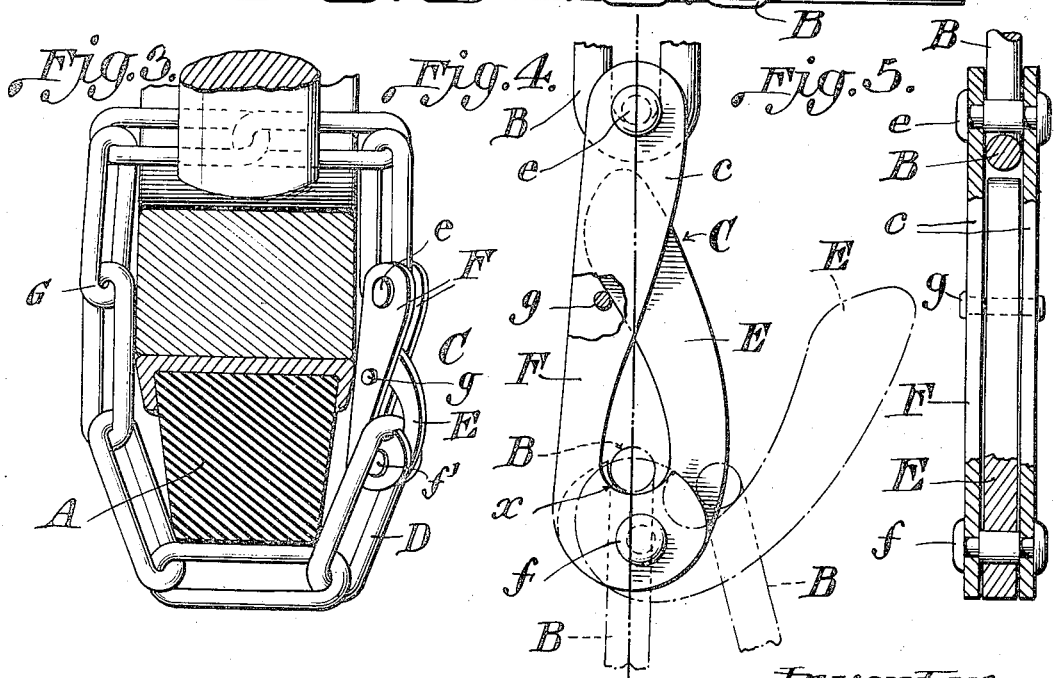
Inventor,
A. Lea Keltner,
by his Attorneys,
Baldwin & Wight

UNITED STATES PATENT OFFICE.

AMOS LEA KELTNER, OF ELDORADO, KANSAS.

CHAIN-FASTENER.

1,374,579.  Specification of Letters Patent.  Patented Apr. 12, 1921.

Application filed August 19, 1920. Serial No. 404,555.

*To all whom it may concern:*

Be it known that I, AMOS LEA KELTNER, a citizen of the United States, residing in Eldorado, in the county of Butler and State of Kansas, have invented certain new and useful Improvements in Chain-Fasteners, of which the following is a specification.

This invention relates to devices for connecting the ends of chains—especially chains employed for anti-skid purposes on automobiles or motor car wheels—and the object of the invention is to provide a strong, durable and efficient fastener which may be easily applied to chains and which will securely fasten and lock the adjacent ends of chains without liability of their becoming unfastened.

In carrying out my invention I provide a frame preferably made of two pieces of metal and held a suitable distance apart to accommodate a locking lever. The two members of the frame at one end are held apart by a properly formed rivet and to this end of the frame one end of a chain is permanently connected and engages the rivet. The other end of the frame has its members held a suitable distance apart by a rivet and is hook shaped, being thus adapted to engage the free end or link of a chain. To the hooked end of the frame is pivotally connected a locking lever having a curved handle and a hooked end corresponding in form to the hook of the frame. The construction is such that when the lever is moved outward, the free link or end of a chain may be slipped over the outer end of the locking lever and then made to engage the hook thereof. When the lever is moved inward its outer end enters the frame, while its hooked end which carries the link moves to register with the hook of the frame and when in this position, the lever is securely held in place when strain is applied to the chain, it being impossible to move the lever out of fastened position by strain on the chain either forward or backward.

My improvements are illustrated in the accompanying drawings, in which—

Figure 1 is a side elevation of a portion of an automobile wheel equipped with an anti-skid chain to which my improved fastening device is applied.

Fig. 2 is a plan view of the same.

Fig. 3 shows how my improvements are applied to a transverse chain on an automobile or truck wheel.

Fig. 4 is a side view of the fastening device and illustrates how it is connected with the chain.

Fig. 5 is a sectional view of the same.

In Figs. 1 and 2, A indicates a portion of a wheel, B the longitudinal members, and B' the transverse members of an anti-skid chain. C indicates my improved fastening device. The fastening device comprises frame members F which are held a suitable distance apart by rivets $e$, $f$. A pin $g$ is placed in the frame about midway between its opposite ends. A locking lever E is pivotally connected between the sides of the frame at $f$ and it is so formed that when turned to the position shown by dotted lines in Fig. 4, the fastening device is opened, and when moved to the position shown by full lines in Fig. 4 the fastening device is closed. The upper portion $c$ of the frame F is slightly enlarged as shown, and the opposite portion is formed with a recess $x$ which provides a hook to engage a chain in the manner indicated. The lever E is formed at its inner end with a recess or hook corresponding in form with the recess $x$. The lever E may be moved outwardly to any desired extent. Its inward movement is arrested by the pin $g$ which acts as a stop. When the lever is in the position shown by dotted lines in Fig. 4 it may be made to engage a link in the manner shown. Then the lever may be turned to the position shown by full lines in Fig. 4, carrying the link with it. It will then be brought into the hook of the frame and as the hook of the frame and the hook of the lever register, the link will be held in such position that when strain is applied to the chain, such strain will be longitudinal of the chain as indicated by dotted lines in Fig. 4. Whether the strain be forward or backward it is impossible to open the fastening device. This can only be done by the hands of an attendant.

In Fig. 3 I have shown the fastening device applied to a chain G which extends around the rim of a truck wheel. The construction of the fastener shown and its operation are the same as those heretofore described.

I claim as my invention:

1. A fastening device for chains, comprising a frame consisting of two members held a suitable distance apart, to one end of which a chain is permanently connected and the other end of which is formed with a hook or recess, and a locking lever formed with a hook or recess adapted to register with the hook or recess of the frame and having a curved handle, the outer end of which is adapted to enter the frame between the sides thereof and between the upper and lower ends of the frame being thus housed and protected against accidental opening.

2. A fastening device for chains, comprising a frame consisting of two members held a suitable distance apart, one end of which is permanently connected with a chain and the opposite end of which is formed with a recess or hook in line with the permanent connection between the frame and the chain, a locking lever pivotally connected with the frame between its sides having a curved outer portion adapted to enter between the sides of the frame, and a hooked portion adapted to register with the hook of the frame.

3. A fastening device for chains, comprising a frame consisting of two members held a suitable distance apart, to one of which a chain is permanently connected, and the other end of which is formed with a hook or recess to receive a link and a locking lever formed with a hook or recess adapted to register with the hook or recess of the frame and which is pivoted to one end of the frame to move about a fixed axis, said lever having a curved handle, the outer end of which is adapted to enter the frame between the sides thereof, and a stop extending from one side member to the other and which the inner end of the curved lever handle engages.

In testimony whereof, I have hereunto subscribed my name.

A. LEA KELTNER.